(12) United States Patent
Kumar et al.

(10) Patent No.: US 10,151,823 B2
(45) Date of Patent: Dec. 11, 2018

(54) METHOD FOR PASSIVE APPROXIMATE LOCALIZATION USING FREQUENCY MODULATION AND SOFTWARE DEFINED RADIO

(71) Applicants: Piyush Kumar, Tallahassee, FL (US); Tathagata Mukherjee, Tallahassee, FL (US); Eduardo L. Pasiliao, Jr., Fort Walton Beach, FL (US); Liqin Xu, Tallahassee, FL (US)

(72) Inventors: Piyush Kumar, Tallahassee, FL (US); Tathagata Mukherjee, Tallahassee, FL (US); Eduardo L. Pasiliao, Jr., Fort Walton Beach, FL (US); Liqin Xu, Tallahassee, FL (US)

( * ) Notice: Subject to any disclaimer, the term of this patent is extended or adjusted under 35 U.S.C. 154(b) by 260 days.

(21) Appl. No.: 15/276,737

(22) Filed: Sep. 26, 2016

(65) Prior Publication Data

US 2017/0090006 A1     Mar. 30, 2017

Related U.S. Application Data

(60) Provisional application No. 62/222,996, filed on Sep. 24, 2015.

(51) Int. Cl.
*G01S 5/02* (2010.01)

(52) U.S. Cl.
CPC .......... *G01S 5/0252* (2013.01); *G01S 5/0226* (2013.01)

(58) Field of Classification Search
CPC ........ G01S 5/0252; G01S 5/0226; G01S 5/02; G01S 5/021; G01S 5/14; H04W 64/00
USPC .......................................................... 342/451
See application file for complete search history.

(56) References Cited

U.S. PATENT DOCUMENTS

| | | | |
|---|---|---|---|
| 9,244,148 B1* | 1/2016 | Sternowski | G01S 5/0221 |
| 2015/0278277 A1* | 10/2015 | Agrawal | G06F 17/30551 |
| | | | 707/746 |
| 2016/0007184 A1* | 1/2016 | Kulikov | G01S 5/0252 |
| | | | 455/41.2 |

* cited by examiner

*Primary Examiner* — Harry K Liu

(57) ABSTRACT

A method for localizing for GPS denied environments is provided with a plurality of broadcasting transmitters and a software-defined radio (SDR). A pre-processing stage and a query phase is executed for localizing an unknown location. The results from the preprocessing stage are made available to the query stage. A simulated power spectrum is computed for a region of interest during the pre-processing phase via the plurality of broadcasting transmitters. A transmitter location, a radius of influence, and a power contour plot of each of the plurality of broadcasting transmitters are used for computing the simulated power spectrum. Next, a peak-finding process, a filtering process, and a localization process is executed during the query phase in order to identify the unknown location.

7 Claims, 7 Drawing Sheets

METHOD FOR PASSIVE APPROXIMATE LOCALIZATION USING FREQUENCY MODULATION AND SOFTWARE DEFINED RADIO

The current application claims a priority to the U.S. Provisional Patent application Ser. No. 62/222,996 filed on Sep. 24, 2015. The current application is filed on Sep. 26, 2016 while Sep. 24, 2016 was on a weekend.

FIELD OF THE INVENTION

The present invention relates generally to a system and apparatus for determining a location, more particularly to a method for analyzing the power spectra of frequency modulation (FM) signals to find the physical location of a user. When the present invention is being used, a simulated map of the area is generated, and the simulated map is correlated to locally acquired signal information to a specific location.

BACKGROUND OF THE INVENTION

Global Positioning System (GPS) technology has become an integral part of our daily activities. However, on most occasions GPS signals can be unreliable or unavailable. Additionally, land vehicles are especially prone to accidental or deliberated GPS interference, which can be disadvantageous to the user. Therefore, the need for a localization system that can not only localize in the absence of GPS signals but also provide services when GPS signals are spoofed is clearly evident.

Apart from GPS based systems, other radio frequency (RF) based localization systems also currently exist. These RF based systems have beacon based or anchor based systems, and are dependent on time of arrival, time difference of arrival, and angle of arrival. However, these methods require expensive hardware for prototyping, a complex time synchronization step, one or more directional antennas, and/or omnidirectional antennas or have problems with multipath.

In addition to the mentioned methods, other distance-dependent features of the RF signal can also be used for localization. As an example, Received Signal Strength Indicator (RSSI), Audio Signal-to-Noise Ratio (SNR), and Stereo Channel Separation (SCS) are also used for GPS free environments. RSSI is known for its cost effectiveness and low computation complexity. However, SNR and SCS have relatively high computational complexity which is disadvantageous.

The objective of the present invention is to address the aforementioned issues. More specifically, the present invention intends to introduce a simple and fast localization algorithm that can localize within a very large area in the absence of a GPS or in the presence of a degraded GPS. In doing so, the present invention has the potential to addresses the low accuracy issues in GPS degraded environments and the slow information processing speeds during initialization of the GPS system. Therefore, by utilizing the present invention in a GPS degraded environment, the user can determine the location with increased accuracy and fast initialization speeds. The present invention is based on analyzing the RSSI obtained using a very cheap hardware and thus the hardware costs are lowered. The present invention uses algorithms for processing the RSSI without explicit analysis of the signal-to-noise ratio (SNR) and/or stereo channel separation (SCS) and hence in turn reduces computation complexity.

DETAIL DESCRIPTIONS OF THE INVENTION

Figure 1:
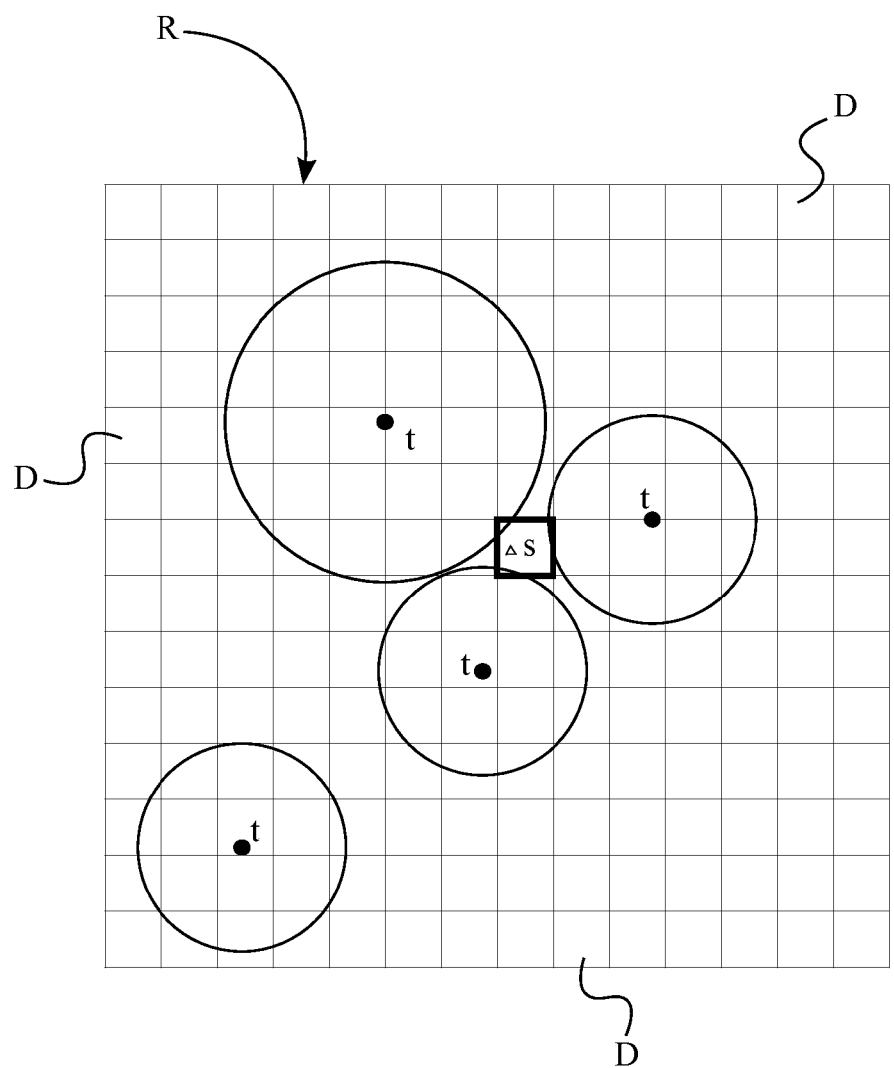
FIG. 1 is a system diagram of the present invention.

All illustrations of the drawings are for the purpose of describing selected versions of the present invention and are not intended to limit the scope of the present invention.

The present invention introduces a coarse and passive localization system for Global Positioning System (GPS) denied and/or GPS degraded environments. More specifically, the present invention localizes within a considerably large area without the use of GPS in the presence of noisy GPS signals. In contrast to traditional localization systems that work in the absence of GPS, the present invention is capable of producing localization results with average errors of less than five miles, without requiring an explicit fingerprinting or crowdsourcing approach. Moreover, the system introduced by the present invention is cost-effective and has comparatively low computational complexity. To minimize costs, the present invention is mainly dependent on signal strength acquired using a cheap software defined radio.

In the process of localizing, the present invention utilizes a plurality of broadcasting transmitters and a software-defined radio (SDR). The plurality of broadcasting transmitters is distributed throughout a region of interest and the SDR is also located within the region of interest. Next, the region of interest is divided into a plurality of geo-hashes wherein each geo-hash of the plurality of geo-hashes is associated with a simulated power spectrum. When the simulated power spectrum at any location within the region of interest can be determined, the present invention senses an observed power spectrum at an unknown location with the SDR. Even though the SDR and the data obtained from the SDR is used in the preferred embodiment of the present invention, a comparable device for sensing power spectrums can be used in other embodiments of the present invention. The unknown location is selected to be within the region of interest so that the simulated power spectrum and the observed power spectrum can be correlated to identify the location coordinates of the unknown location. In the process of sensing the observed power spectrum, the present invention executes a peak-finding process with the SDR in order to identify dominant frequencies within the observed power spectrum. More specifically, the data obtained from the SDR is used. The peak-finding process can also be referred to as a denoising process which is used to identify dominant frequencies within the observed power spectrum and eliminate ambient noise. As a result of the process, the noise from the acquired data is implicitly removed so that the need to analyze the signal-to-noise ratio (SNR) is also eliminated. A filtering process is then executed with the SDR in order to identify proximal geo-hashes, which are the most relevant candidate geo-hashes, from the plurality of geo-hashes. As mentioned earlier, the data obtained from the SDR is used during this filtering process. The proximal geo-hashes are selected so that the simulated power spectrum for each of the proximal geo-hashes share similar dominant frequencies with the observed power spectrum. More precisely, each proximal geo-hash shares similar frequency patterns and hence dominant frequencies with the observed power spectrum. When the proximal geo-hashes are determined, the present invention executes a localization process to identify the unknown location as a closest geo-hash from the proximal geo-hashes. In doing so, the SDR and the data obtained with the SDR is specifically used when executing the localization process. More specifically, the simulated power spectrum for the closest geo-hash shares similar power values at the dominant power frequencies of the observed power spectrum. Moreover, the observed values of the dominant power frequencies at the closest geo-hash is also similar to the actual observed values of the dominant frequencies. As a result, the closest geo-hash is determined to be the geo-hash of the unknown location.

Figure 3:
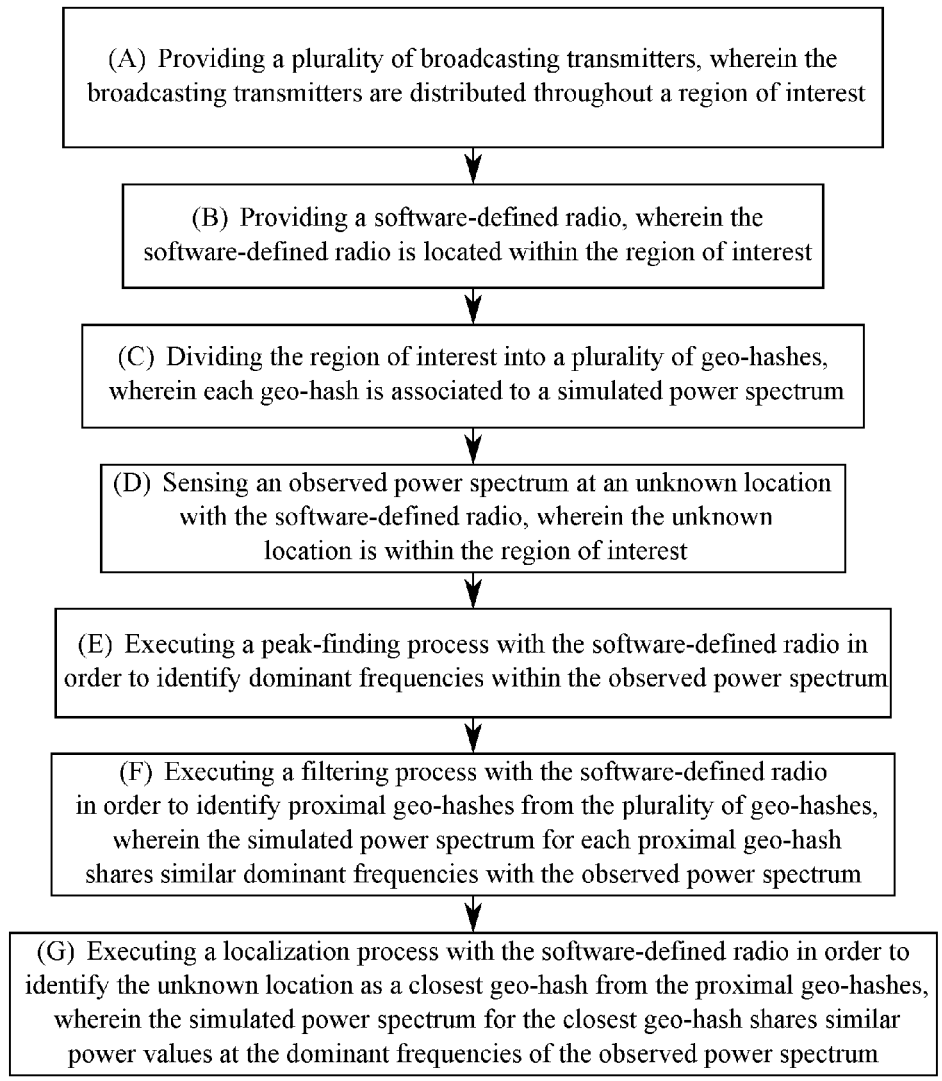
FIG. 3 is a flowchart illustrating the overall process of the present invention.

As illustrated in FIG. 1 and FIG. 3, in the process of producing localization results, the present invention is provided with the plurality of broadcasting transmitters, wherein the plurality of broadcasting transmitters is distributed throughout the region of interest (which is denoted by R). The high frequencies used by the plurality of broadcasting transmitters helps the signals transmitted to be less sensitive to external factors such as weather conditions and terrain and at the same time travel over very large distances, thus enabling localization over very large areas. The region of interest can vary in different embodiments of the present invention. As an example, the entire United States can be considered to be the region of interest in the preferred embodiment of the present invention. When considering the plurality of broadcasting transmitters, the transmitted power and the position of each of the plurality of broadcasting transmitters is assumed to be known. As mentioned earlier, the present invention is also provided with the SDR, wherein the software-defined radio is located within the region of interest. The SDR (which is denoted by s), is used to listen to broadcast signals from the plurality of broadcasting transmitters. In the preferred embodiment of the present invention, the SDR is equipped with an antenna which is mounted on the top of a testing vehicle. However, the SDR used can vary in different embodiments of the present invention. Reading errors from the SDR, moving objects along the transmission path, and unstable transmission from the plurality of broadcasting transmitters can affect the overall power reading from the SDR.

The localization process introduced by the present invention is completed through two stages, namely a preprocessing stage and a query stage. The preprocessing stage is completed and the results from the preprocessing stage are assumed to be available at the query stage. As an initial step of the preprocessing stage, the present invention creates a simulation map. The simulation map can also be referred to as a prediction map. To create the simulation map, the region of interest is initially divided into the plurality of geo-hashes of a given fixed precision. For clarification purposes, the plurality of geo-hashes can be considered to be rectangular cells and will be denoted by D for future reference. Next, the simulated power spectrum associated with each of the plurality of geo-hashes is used to generate the simulation map for the region of interest. The simulated power spectrum provides information regarding the expected power values at each of the plurality of geo-hashes. On the other hand, the simulation map is a collective representation of the simulation power spectrum at each of the plurality of geo-hashes.

Figure 2:
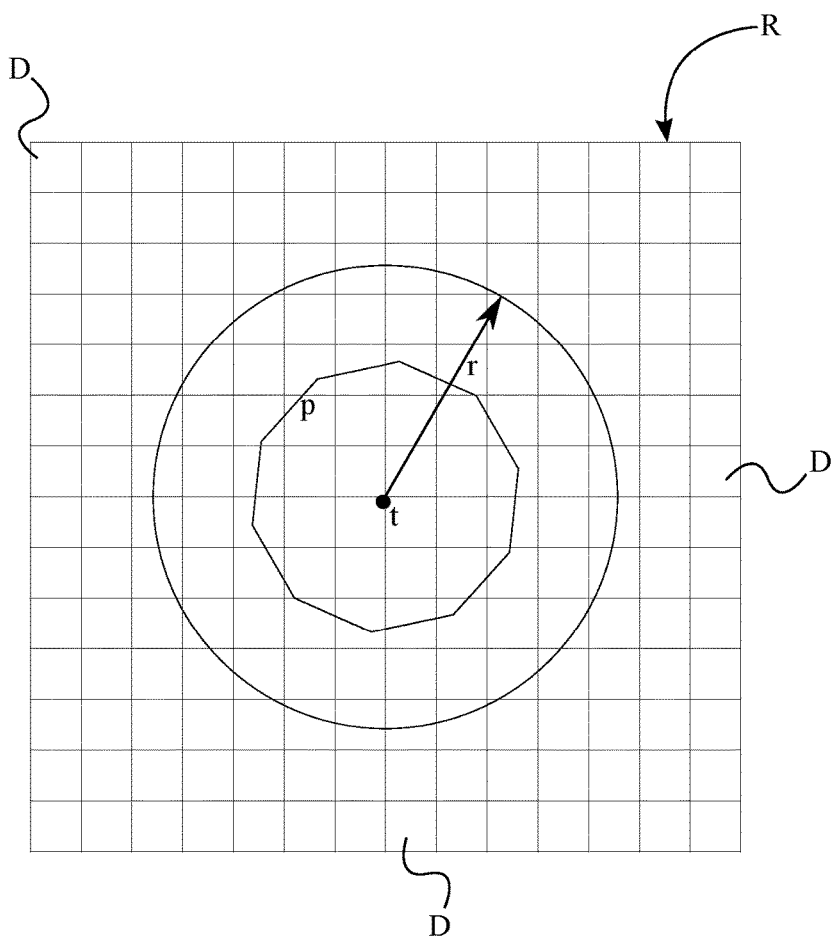
FIG. 2 is an illustration of the transmitter location, the radius of influence, and the power contour plot of each of the plurality of broadcasting transmitters.
Figure 4:
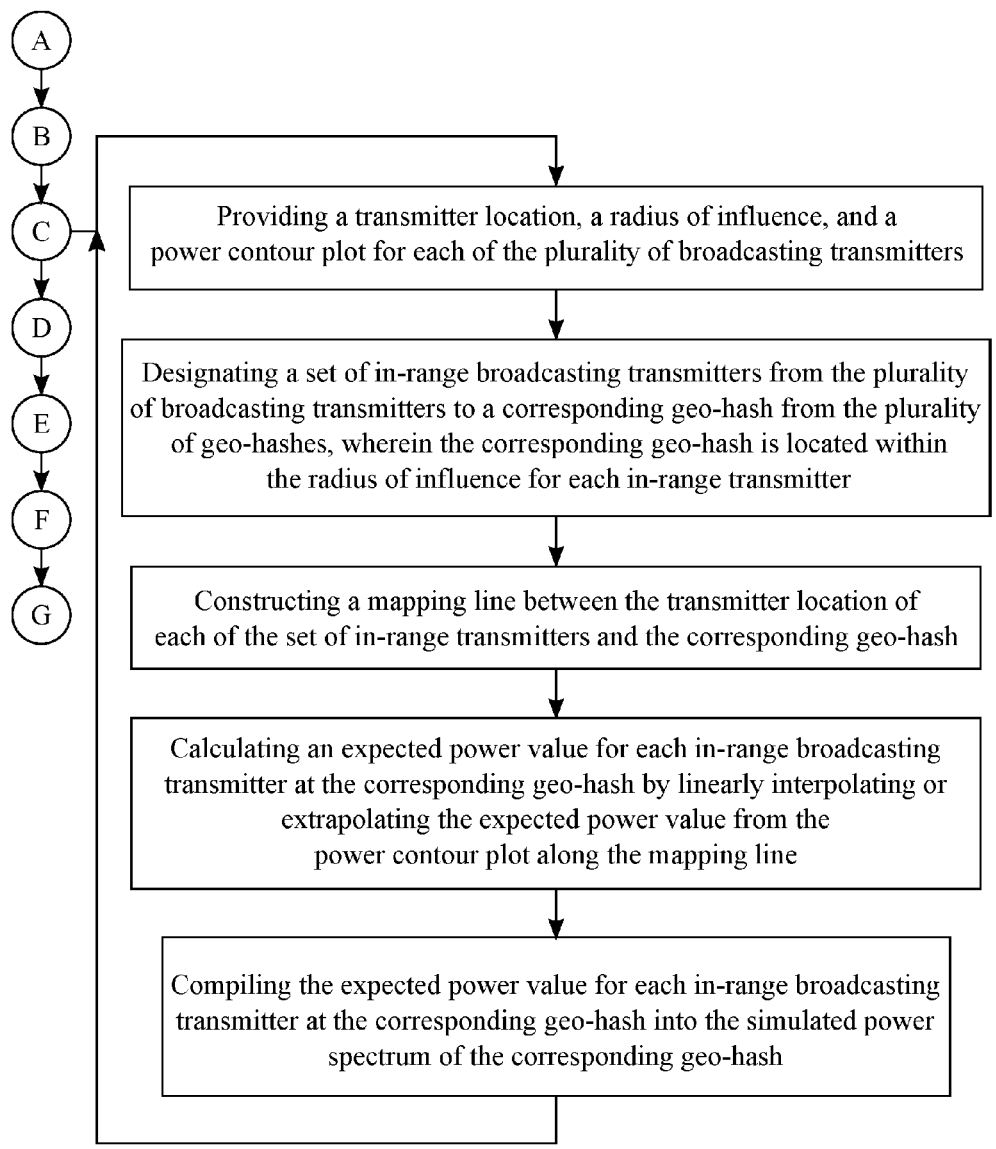
FIG. 4 is a flowchart illustrating the process of creating the simulated power spectrum.

In the process of creating the simulation map, it is assumed that information regarding each of the plurality of broadcasting transmitters is known. As shown in FIG. 4, a transmitter location, a radius of influence, and a power contour plot for each of the plurality of broadcasting transmitters is provided. More specifically, the transmitter location, the radius of influence, and the power contour plot is assumed to be available. The transmitter location gives the location coordinates for each of the plurality of broadcasting transmitters within the region of interest. The radius of influence, which is denoted by r, provides information on the range covered by each of the plurality of broadcasting transmitters. On the other hand, the power contour plot is a star polygon with 360 vertices and represents an area with fixed power values as seen in FIG. 2. In the preferred embodiment of the present invention, the p-decibel unloaded (p-dBu) power contour plot corresponding to each of the plurality of broadcasting transmitters is denoted by $\rho$. In this instance, dBu is a unit used to measure the electric field intensity. Using the information provided for each of the plurality of broadcasting transmitters, the simulated power spectrum at all points within the radius of influence can be calculated. When calculating the simulated power within the region of interest, a set of in-range transmitters from the plurality of broadcasting transmitters is designated to a corresponding geo-hash from the plurality of geo-hashes from the region of interest. The corresponding geo-hash is selected to be within the radius of influence of each in-range transmitter which are in the immediate vicinity of the corresponding geo-hash. Upon designating the set of in-range transmitters the present invention constructs a mapping line between the transmitter location of each of the set of in-range transmitters and the corresponding geo-hash. The mapping line is used to calculate the power at any point along a path between the corresponding geo-hash and the transmitter location of any of the in-range transmitters. More precisely, for the corresponding geo-hash, the present invention computes the intersection of the mapping line between the corresponding geo-hash, the transmitter location, and the power contour plot. Next, the present invention calculates an expected power value for each in-range broadcasting transmitter at the corresponding geo-hash by linearly interpolating or extrapolating the expected power value from the power contour plot along the mapping line. In other words, the expected power value is determined by using known data points along the mapping line. Next, the present invention compiles the expected power value for each in-range broadcasting transmitter at the corresponding geo-hash into the simulated power spectrum of the corresponding geo-hash using well known formulas from the realm of Physics. In other words, for points that are in the intersection of several towers, the estimated powers are aggregated using power related formulas to get the predicted power at that point.

The following algorithms are utilized in the process of creating the simulated power for the plurality of geo-hashes. Algorithm 1 takes a list of tuples as input. Each tuple is of the form (t, r, p) where t is the transmitter location, r is the radius of influence, and p is the p-dBu power contour plot. The algorithm for computing the power using the subroutine "CalculatePower" is described in Algorithm 2.

Algorithm 1—Outputs a model of the simulated Received Signal
Strength Indication (RSSI)

Require: τ: list of broadcasting transmitter tuple (t, r, p)
Require: t: a broadcasting transmitter from the plurality of
broadcasting transmitters.
Require: r: the radius of influence of the broadcasting transmitter.
Require: p: p-dBu power contour plot for the broadcasting
transmitter.
1. function Simulate (τ)
2.    D ← GenGeoHash ( ) : Generate the plurality of geo-hashes
3.    for x ∈ D do
4.       HT [x] ← [ − ∞ ]*101
5.    end for
6.    for (t, r, p) ∈ τ do
7.       for x ∈ GetPixels (t, r) do
8.          v ← HT [x]
9.          y ← RayIntersect (p, Location (t), x)
10.         $d_1$ ← ‖ y− Location (t) ‖
11.         $d_2$ ← ‖ x− Location (t) ‖
12.         j ← FreqIndex (t)
13.         a = (Power (t), $d_1$, $d_2$, $v_j$)
14.         $v_j$ ← CalculatePower (a)
15.         HT [x] = v
16.       end for
17.    end for
18.    return HT
19. end function Algorithm 2—Outputs simulated power spectrum at the corresponding
geo-hash Require: τ: tuple containing following:
Require: Power (t): transmitted power of the broadcasting
transmitter t in Kilowatt (kW)
Require: $d_1$: distance of the power contour plot intersection
from the center of tower.
Require: $d_2$: distance from the corresponding geo-hash to the
center of broadcasting transmitter.
Require: a: the previous known power at the corresponding
geo-hash.
1.    function Calculate power (τ)
2.       if $d_2$ < 0.1 then
3.          $d_2$ ← 0.1
4.       end if
5.       k ← Power (t)
6.       d ← k − 40log($d_2$/$d_1$)
7.       if a = = − ∞ then return d
8.       end if
9.       b ← Aggregate (d, a)
10.      return b
11.   end function The following information describes the different functions that have been used when calculating the simulated power by using Algorithm 1 and Algorithm 2.

Location (t): the transmitter location of the broadcasting transmitter. t can be used instead of Location (t) since t denotes the broadcasting transmitter with the location coordinates.

RayIntersect (p, Location (t), x): Calculates the intersection of the mapping line (Location (t), x) from the tower location t to the corresponding geo-hash. The corresponding geo-hash is denoted by x. With the power contour plot p in local stereographic projection, which is centered at the transmitter location of the broadcasting transmitter. The power contour plot is preprocessed to allow binary search which gives the ability to implement the primitive in O (n log n) time. In the present invention, n=360 which is the number of sides of the polygon.

GetPixels (t, r): gathers the plurality of geo-hashes within the radius of influence r centered at the tower location t. The plurality of geo-hashes within the region of interest is calculated from the pixels.

GenGeoHash ( ): Generates the plurality of geo-hashes within the region of interest and outputs the plurality of geo-hashes generated.

FreqIndex (t): Returns the index in [1, 101] for the broadcasting transmitter given the frequency.

Freq (t): returns the frequency of the broadcasting transmitter given by t.

Power (t): returns the transmitted frequency of the broadcasting transmitter in kilowatts (kW).

Aggregate (d, a): considers a power reading a and converts into a linear scale to sum up with the current voltage reading d. Next, the value is converted into a logarithmic scale and returns the aggregated new power.

The availability of the simulation map can be compared to a map being available to a GPS enabled system. When the present invention is used to find the unknown location, the present invention senses the observed power spectrum at the unknown location, which is within the region of interest. The SDR is used to sense the observed power spectrum which is the observed power value at a given location for each of the 101 FM channels in the preferred embodiment of the present invention. As mentioned earlier, the SDR is mounted onto a testing vehicle in the preferred embodiment of the present invention. If data from the SDR is perfect, then the observed power spectrum would agree exactly with the simulated power spectrum. However, since the model used in the present invention is not perfect and the data collection hardware contains errors, the simulated power spectrum will not match exactly with the observed power spectrum. Moreover, as the observed power spectrum is usually corrupted by noise by the objects in the surrounding and multipath, not all data in the observed power spectrum is accurate. The noise can also be due to interference with other electromagnetic waves, as well as ambient temperature and humidity. The present invention determines the observed power spectrum as part of the query stage mentioned before and the final localization is based on the results obtained from the pre-processing stage. In general, the query phase collects the observed power spectrum and then outputs an approximate location of the unknown location. The peak-finding process, the filtering process, and the localization processes are subsequently executed when determining the unknown location.

Figure 5:
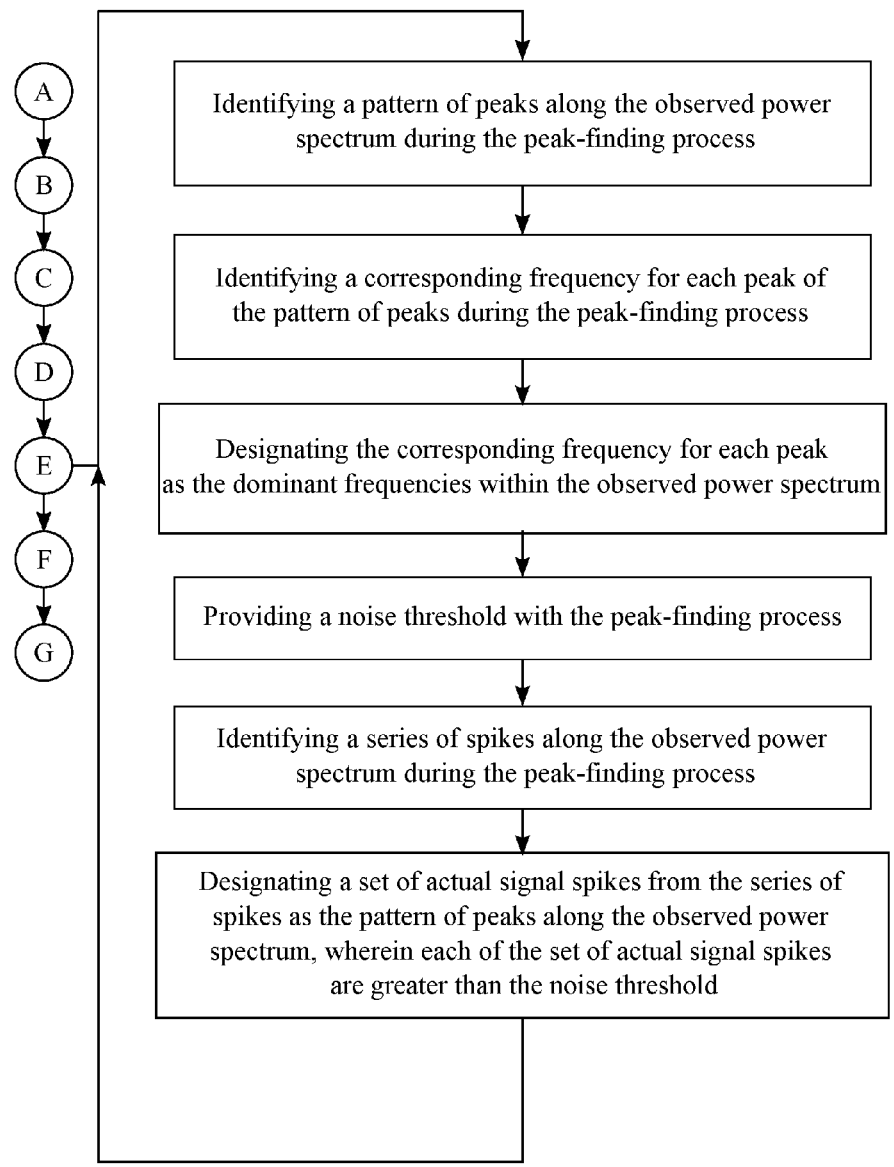
FIG. 5 is a flowchart illustrating the process of the peak-finding process.

The peak-finding process is executed on the data obtained with the SDR upon sensing the observed power spectrum at the unknown location. By executing the peak-finding process, the present invention detects the dominant frequencies, which are the most significant frequencies, within the observed power spectrum for the unknown location. The dominant frequencies and the power received at these dominant frequencies are later converted into a location by correlating with the simulation map. Informally, the peaks detected in the peak-finding process are local maxima in the observed power spectrum. As an initial step of the peak-finding process, the present invention observes the received signal strength values of the signal received at the unknown location. In doing so, the present invention also captures the peak power values, which are significantly above the noise level. More specifically, only the power values that are significantly large are considered during the peak-finding process. The unique situation of the present invention and the data obtained during the localization process restricts the ability to use existing peak-finding algorithms usually made available through Matlab and Scipy. In order to address the issue, the present invention searches for "spikes" along the observed power spectrum starting from the beginning. During the peak-finding process, the present invention identifies a pattern of peaks along the observed power spectrum as shown in FIG. 5 so that the pattern of peaks is representative of the spikes along the observed power spectrum. Upon identifying the pattern of peaks, the present invention then proceeds to identify a corresponding frequency for each peak from the pattern of peaks during the peak-finding process. Next, as mentioned before, the corresponding frequency is designated for each peak as the dominant frequencies within the observed power spectrum since the corresponding frequency results in a peak within the pattern of peaks. If the observed power spectrum is denoted by $\psi$, the $i^{th}$ actual value is the peak if and only if the following condition is satisfied:

$$\min (\psi_{1i}-\psi_{i-1}, \psi_i-\psi_{i+1}) > v \text{ for a given constant } v > 0$$
that depends on the data and $i \in [2, \ldots, |\psi|<1]$.

If the observed value satisfies the above mentioned condition, the present invention collects all such peaks and sorts them by value or corresponding values of the boundary cases. More specifically, the present invention collects at most n such peaks after sorting the pattern of peaks by the value of $\min (\psi_i-\psi_{i-1}, \psi_i-\psi_{i+1})$ or the corresponding values for the boundary cases. In the present invention the pattern of peaks is represented by $\rho$. The algorithm used for outputting the pattern of peaks in the observed power spectrum is as follows:

Algorithm 3—Outputs the pattern of peaks in the observed power spectrum 1. function FindPeaks ($\psi$)
2. $\rho \leftarrow [ \ ]$ :for peaks
3. $k \leftarrow$ cutoff 1
4. $v \leftarrow$ cutoff 2
5. for (i, pw) $\in$ Enumerate ($\psi$) do
6. $\quad$ lg $\leftarrow \min \{pw - \psi_{i-1}, pw - \psi_{i+1}\}$
7. $\quad$ if lg > v then
8. $\quad\quad$ $\rho$. add((pw, lg, i))
9. $\quad$ end if
10. end for
11. $\rho \leftarrow$ MinK ($\rho$, k)
12. return $\rho$
13. end function k and v of the above algorithm are set to two cutoff values. These parameters control the number of peaks that is finally selected in the pattern of peaks. In the preferred embodiment of the present invention, k=25 and v=8 was experimentally proven to give the most number of peaks.

As part of the peak-finding process, the present invention is provided with a noise threshold. More precisely, an estimation of the noise threshold is implicitly provided. The noise threshold is used to separate noise from an actual signal. As mentioned earlier, the peaks are local maxima in the observed power spectrum. In order to ensure that the peaks are not caused by ambient noise, the channels corresponding to the peaks are required to have significantly more power than the neighboring channels so that the noise threshold is then used to determine the noise from the actual signal. As seen in Algorithm 3, given the observed power spectrum $\psi$, the pattern of peaks is represented by $\rho$. The present invention initially identifies a series of spikes along the observed power spectrum during the peak-finding process. Next, the present invention designates a set of actual signal spikes from the series of spikes as the pattern of peaks along the observed power spectrum. In this instance, the set of actual signal spikes are selected to be greater than the noise threshold. The series of spikes represent the power values most likely to have location information within the observed power spectrum.

Upon completing the peak-finding process, the present invention executes the filtering process using the data from the SDR in order to identify proximal geo-hashes from the plurality of geo-hashes. As mentioned earlier, the proximal geo-hashes are determined such that, the simulated power spectrum for each proximal geo-hash shares similar dominant frequencies with the observed power spectrum. The goal of the filtering process is to reduce the initial search area, which is the whole region of interest. As an example, the filtering process can narrow the region of interest to a few hundred square miles of the unknown location. In order to execute the filtering process, the present invention uses a subset query problem approach. In this approach, the simulated power spectrum for each of the plurality of geo-hashes is used to calculate the subset model denoted by SS. The model SS is a dictionary where the keys are 101 length bit vectors and the associated values are geo-hashes selected from the plurality of geo-hashes. In the process of computing SS, the present invention denotes the simulated power for each of the plurality of geo-hashes by a vector i in HT. From the vector, the present invention creates a bit vector b, such that the value at the $i^{th}$ position is 1 if the power corresponding to a specific channel is non-zero in $\varepsilon$. The length of b is 101 in correspondence to the possible 101 FM channels.

When the pattern of peaks is identified, the present invention executes the following function in order to output the plurality of geo-hashes that match the pattern of observed power, which also represents the pattern of peaks as a subset.

Algorithm 4: Outputs the plurality of geo-hashes matching the pattern of peaks.

Figure 6:
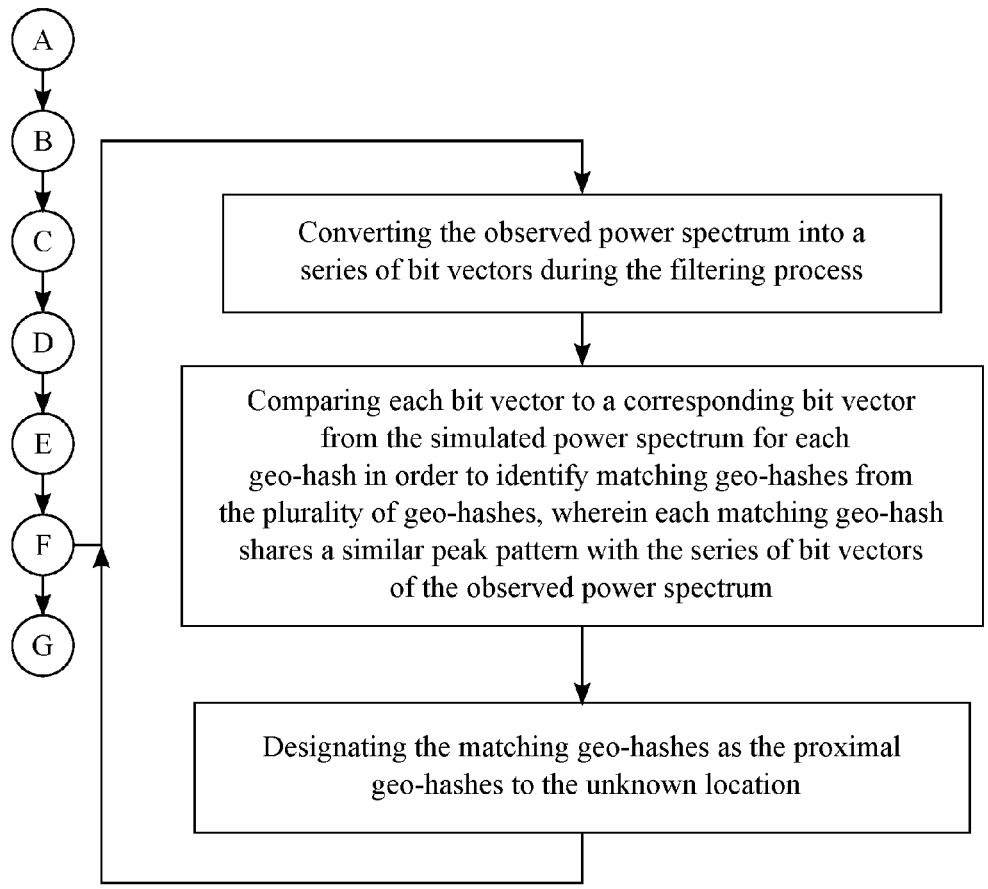
FIG. 6 is a flowchart illustrating the process of the filtering process.

Require: $\rho$: SubsetFilter ($\rho$, SS)
Require: SS: hash table: bit vectors to the plurality of geo-hashes.
1. function SubsetFilter ($\rho$, SS)
2. $\quad$ M $\leftarrow \Phi$
3. $\quad$ b $\leftarrow$ Bit Vector corresponding to $\rho$
4. $\quad$ for d $\in$ SS. keys ( ) do
5. $\quad\quad$ if b $\wedge$ d == b then
6. $\quad\quad\quad$ M $\leftarrow$ M $\cup$ SS [d]
7. $\quad\quad$ end if
8. $\quad$ end for
9. $\quad$ return M
10. end function During the filtering process, the present invention converts the observed power spectrum into a series of bit vectors as illustrated in FIG. 6. When converted, each bit vector for the observed power spectrum is compared to a corresponding bit vector from the simulated power spectrum for each geo-hash in order to identify matching geo-hashes from the plurality of geo-hashes. If matched, each matching geo-hash shares a similar actual power pattern and hence similar peak pattern with a series of bit vectors for the observed power spectrum. Next, the present invention designates the matching geo-hashes as the proximal geo-hashes and possible candidates for the unknown location. If the broadcasting transmitters are frequency modulation (FM) transmitters as in the preferred embodiment of the present invention, the series of length bit vectors includes 101 length bit (101-length bit) vectors that correspond to the 101 possible FM channels. More specifically, the 101 FM channels that span from 88.1 MHz to 107.9 MHz are represented by the 101 length bit vectors. However, in different embodiments of the present invention, the plurality of broadcasting transmitters can be a different broadcasting method which transmits at a very high frequency so that the transmitter location, the radius of influence, and the power contour plot can be determined. As a result, a given length of each of the series of bit vectors will be determined by a number of channels within a given transmission frequency range.

As a final step of the process, the present invention executes the localization process with the data from the SDR in order to identify the unknown location as the closest geo-hash from the proximal geo-hashes that has a similar peak structure and resultantly similar power values. The localization process is executed so that the simulated power spectrum for the closest geo-hash shares similar power values at the dominant frequencies of the observed power spectrum. In other words, the present invention outputs an approximate location of the point at which the data was collected by using the closest geo-hash, wherein the closest distant is measured in terms of the Euclidean distance between peaks. At the conclusion of the localization process, the present invention determines the unknown location with accuracy levels that are greater than existing methods used in GPS denied/degraded environments.

Figure 7:
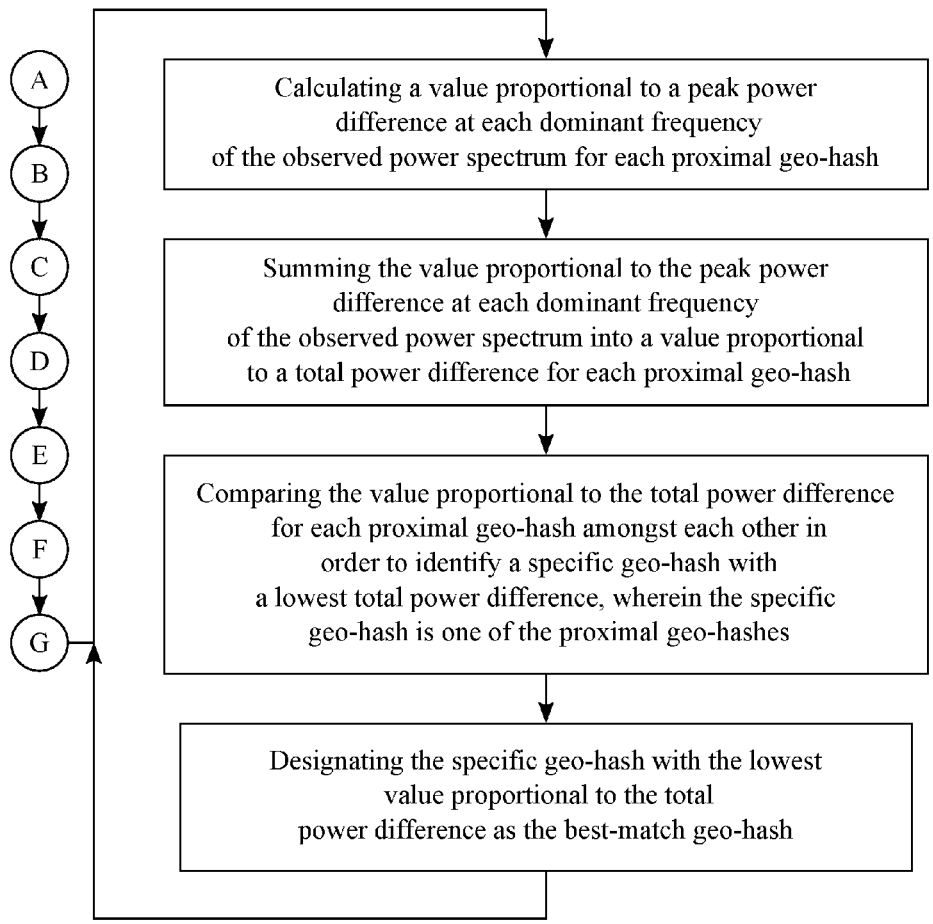
FIG. 7 is a flowchart illustrating the process of the localization stage of the present invention.

As illustrated in FIG. 7, in order to determine the unknown location from the proximal geo-hashes, the present invention calculates a value proportional to a peak power difference at each dominant frequency of the observed power spectrum for each proximal geo-hash. In the preferred embodiment of the present invention, the value proportional to the peak power difference is a squared value of the peak power difference. The sum of squares of peak power difference is beneficial in determining the best match between the simulated power spectrum and the observed power spectrum. In the process of doing so, the present invention sums the proportional value of the peak power difference at each dominant frequency of the observed power spectrum into a value proportional to a total power difference for each proximal geo-hash. More specifically, the squared value of the peak power difference for each proximal geo-hash is summed. When summing is complete, the present invention compares the value proportional to the total power difference for each proximal geo-hash amongst each other in order to specify a specific geo-hash with a lowest value proportional to the total power difference. More specifically, the specific geo-hash is selected from the proximal geo-hashes. In order to most accurately determine the unknown location, the specific geo-hash with the lowest total sum of squared power difference is designated as the best-match geo-hash. More specifically, the lowest total sum of square power difference is designated as the best-match geo-hash.

As mentioned earlier, the results from the preprocessing phase are made available to the query phase. In the process of outputting the approximate localization, the present invention utilizes the following algorithm.

---

Algorithm 5: Outputs Approximate localization.

Require: HT: simulated power spectrum.
Require: SS: Model for subset filter.
1.    function Localize (HT, SS)
2.        $\psi \leftarrow$ AcquireRTLPower ( )
3.        $\rho \leftarrow$ FindPeaks ($\psi$)
4.        M $\leftarrow$ Subset Filter ($\rho$, SS)
5.        o $\leftarrow$ argmin$_{i \in M}$ EuclidDist (Power(i), Caliberate ($\psi$), $\rho$)
6.        return Geohash. Decode (o)
7.    end function

---

The following statements are true for Algorithm 5:
EuclidDist ($\tau$, $\psi$, $\rho$): Returns a number which is representative of the sum of squared peak differences between the $\tau$ and $\psi$, over the pattern of peaks $\rho$.
Power (i): Returns the power spectrum of the geo-hash i.
Calibrate (u): Calibrates the observed power spectrum using a linear regression.

When considering Algorithm 5, the present invention initially acquires the power spectrum during the step $\psi \leftarrow$ AcquireRTLPower ( ) Next, the present invention searches for the pattern of peaks through $\rho \leftarrow$ FindPeaks ($\psi$). Subsequently, the subset filtering process is executed through M $\leftarrow$ Subset Filter ($\rho$, SS). Resultantly, the search area is reduced to the vicinity of the unknown location denoted by x. When the candidate with the smallest power difference is identified, which is the smallest sum of squares, the unknown location is recognized.

By utilizing the preferred embodiment of the present invention, the user obtains an approximate localization using a cheap SDR and ambient FM signals. The accuracy of the preferred embodiment of the present invention is in the range of 5 miles on average and is sufficient enough to avoid GPS spoofing and for working in GPS denied or GPS degraded environments. The accuracy of the present invention can be improved through multiple approaches such as the use of directional antennas, the use of Unmanned Aerial Vehicles (UAVs) to acquire data for localization during the query phase to avoid multi-path, the use of Time Difference of Arrival (TDoA) or Angle of Arrival (AoA) based methods to augment the current system, and the use of better resolution simulations. Additionally, incorporating the processed data back into the simulations in order to improve the simulation quality, the use of alternate modalities of data having location information that can be, but is not limited to, Automatic Dependent Surveillance—Broadcast (ADS-B) and Iridium Satellite Constellation, the use of Longley-Rice or other comparable methods for simulation, and the use of Signal Propagation, Loss, and Terrain (SPLAT) for simulation, are some of the other methods that can be incorporated into the present invention for improved accuracy.

Although the invention has been explained in relation to its preferred embodiment, it is to be understood that many other possible modifications and variations can be made without departing from the spirit and scope of the invention as hereinafter claimed.

What is claimed is:
1. A method for passive approximate localization using broadcast waves and software-defined radio, the method comprises the steps of:
(A) providing a plurality of broadcasting transmitters, wherein the broadcasting transmitters are distributed throughout a region of interest;
(B) providing a software-defined radio, wherein the software-defined radio is located within the region of interest;
(C) dividing the region of interest into a plurality of geo-hashes, wherein each geo-hash is associated to a simulated power spectrum;
(D) sensing an observed power spectrum at an unknown location with the software-defined radio, wherein the unknown location is within the region of interest;
(E) executing a peak-finding process with the software-defined radio in order to identify dominant frequencies within the observed power spectrum;
(F) executing a filtering process with the software-defined radio in order to identify proximal geo-hashes from the plurality of geo-hashes, wherein the simulated power spectrum for each proximal geo-hash shares similar dominant frequencies with the observed power spectrum; and

(G) executing a localization process with the software-defined radio in order to identify the unknown location as a closest geo-hash from the proximal geo-hashes, wherein the simulated power spectrum for the closest geo-hash shares similar power values at the dominant frequencies of the observed power spectrum.

2. The method for passive approximate localization using broadcast waves and software-defined radio, the method as claimed in claim 1 comprises the steps of:
providing a transmitter location, a radius of influence, and a power contour plot for each of the plurality of broadcasting transmitters;
designating a set of in-range broadcasting transmitters from the plurality of broadcasting transmitters to a corresponding geo-hash from the plurality of geo-hashes, wherein the corresponding geo-hash is located within the radius of influence for each in-range transmitter;
constructing a mapping line between the transmitter location of each in-range broadcasting transmitter and the corresponding geo-hash;
calculating an expected power value for each in-range broadcasting transmitter at the corresponding geo-hash by linearly interpolating or extrapolating the expected power value from the power contour plot along the mapping line; and
compiling the expected power value for each in-range broadcasting transmitter at the corresponding geo-hash into the simulated power spectrum of the corresponding geo-hash.

3. The method for passive approximate localization using broadcast waves and software-defined radio, the method as claimed in claim 1 comprises the steps of:
identifying a pattern of peaks along the observed power spectrum during the peak-finding process;
identifying a corresponding frequency for each peak from the pattern of peaks during the peak-finding process; and
designating the corresponding frequency for each peak as the dominant frequencies within the observed power spectrum.

4. The method for passive approximate localization using broadcast waves and software-defined radio, the method as claimed in claim 3 comprises the steps of:
providing a noise threshold with the peak-finding process;
identifying a series of spikes along the observed power spectrum during the peak-finding process; and
designating a set of actual signal spikes from the series of spikes as the pattern of peaks along the observed power spectrum, wherein each of the set of actual signal spikes are greater than the noise threshold.

5. The method for passive approximate localization using broadcast waves and software-defined radio, the method as claimed in claim 1 comprises the steps of:
converting the observed power spectrum into a series of bit vectors during the filtering process;
comparing each bit vector to a corresponding bit vector from the simulated power spectrum for each geo-hash in order to identify matching geo-hashes from the plurality of geo-hashes, wherein each matching geo-hash shares a similar peak pattern with the series of bit vectors of the observed power spectrum; and
designating the matching geo-hashes as the proximal geo-hashes to the unknown location.

6. The method for passive approximate localization using broadcast waves and software-defined radio, the method as claimed in claim 5, wherein:
the broadcasting transmitters are frequency modulation (FM) transmitters; and
the series of bit vectors includes 101 bit vectors, wherein a given length of each of the series of bit vectors is determined by a number of channels within a transmission frequency range.

7. The method for passive approximate localization using broadcast waves and software-defined radio, the method as claimed in claim 1 comprises the steps of:
calculating a value proportional to a peak power difference at each dominant frequency of the observed power spectrum for each proximal geo-hash;
summing the value proportional to the peak power difference at each dominant frequency of the observed power spectrum into a value proportional to a total power difference for each proximal geo-hash;
comparing the value proportional to the total power difference for each proximal geo-hash amongst each other in order to identify a specific geo-hash with a lowest value proportional to the total power difference, wherein the specific geo-hash is one of the proximal geo-hashes; and
designating the specific geo-hash with the lowest value proportional to the total power difference as the best-match geo-hash.

* * * * *